US009022460B2

(12) United States Patent
Chung et al.

(10) Patent No.: US 9,022,460 B2
(45) Date of Patent: May 5, 2015

(54) FRONT END MODULE FOR VEHICLE (71) Applicant: Hyundai Motor Company, Seoul (KR)

(72) Inventors: Hee Suk Chung, Hwaseong-si (KR); Dae Hyun Song, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/902,523

(22) Filed: May 24, 2013

(65) Prior Publication Data

US 2014/0159429 A1    Jun. 12, 2014

(30) Foreign Application Priority Data

Dec. 7, 2012   (KR) .................... 10-2012-0141780

(51) Int. Cl.
*B62D 25/08* (2006.01)

(52) U.S. Cl.
CPC ............. *B62D 25/08* (2013.01); *B62D 25/085* (2013.01)

(58) Field of Classification Search
CPC .... B62D 25/08; B62D 25/085; B62D 25/163; B62D 21/152
USPC ............. 296/193.09, 187.09, 198, 30, 203.02
See application file for complete search history.

(56) References Cited

U.S. PATENT DOCUMENTS 7,052,076 B2   5/2006  Kim

FOREIGN PATENT DOCUMENTS

| JP | 10-264855 | 10/1998 |
|----|-----------|---------|
| JP | 2000-177651 A | 6/2000 |
| JP | 2004-314932 A | 11/2004 |
| JP | 2006-206000 A | 8/2006 |
| JP | 2008-162369 A | 7/2008 |
| JP | 2009-248820 A | 10/2009 |
| JP | 2011-084196 A | 4/2011 |
| KR | 2004-0089857 A | 10/2004 |
| KR | 2005-0037207 A | 4/2005 |
| KR | 2007-0065033 A | 6/2007 |

*Primary Examiner* — Glenn Dayoan
*Assistant Examiner* — Dana Ivey
(74) *Attorney, Agent, or Firm* — McDermott Will & Emery LLP (57) ABSTRACT

A front end module for a vehicle includes a first box-type mounting part and a second box-type mounting part. The first box-type mounting part is disposed on a connection portion of a front end module lower member with a front side member. The second box-type mounting part is disposed on a front end portion of the front side member. The first and second box-type mounting parts are coupled to each other by bolt coupling or welding such that sections thereof are connected to each other upon assembling of the front end module and the front side member.

2 Claims, 8 Drawing Sheets

[CROSS-SECTION OF LINE A-A]

[CROSS-SECTION OF LINE B-B]

FIG. 8b

FRONT END MODULE FOR VEHICLE

CROSS-REFERENCE TO RELATED APPLICATION

This application claims under 35 U.S.C. §119(a) the benefit of Korean Patent Application No. 10-2012-0141780 filed Dec. 7, 2012, the entire contents of which are incorporated herein by reference.

BACKGROUND (a) Technical Field

The present disclosure relates to a front end module for a vehicle. More particularly, it relates to a front end module for a vehicle, which increases a bending and torsional stiffness of a vehicle body by improving the sectional structure of a part in which a front side member and a front end module lower member are connected.

(b) Background Art

Generally, a front end module of a vehicle forms the front part of a vehicle body framework. Recently, the front end module has been used as a place where a package such as a radiator, a condenser and a fan is installed to secure a space of an engine room.

Thus, the front end module is a structure that supports a radiator assembly in which a condenser for an air conditioner and a radiator are integrated and a bumper installed at the front side of a vehicle body. The front end module includes upper and lower members that are horizontally disposed at the upper end and the lower end, respectively, and a vertical member vertically connecting between both upper and lower members, which are integrally modularized in the front end module.

Figure 1:
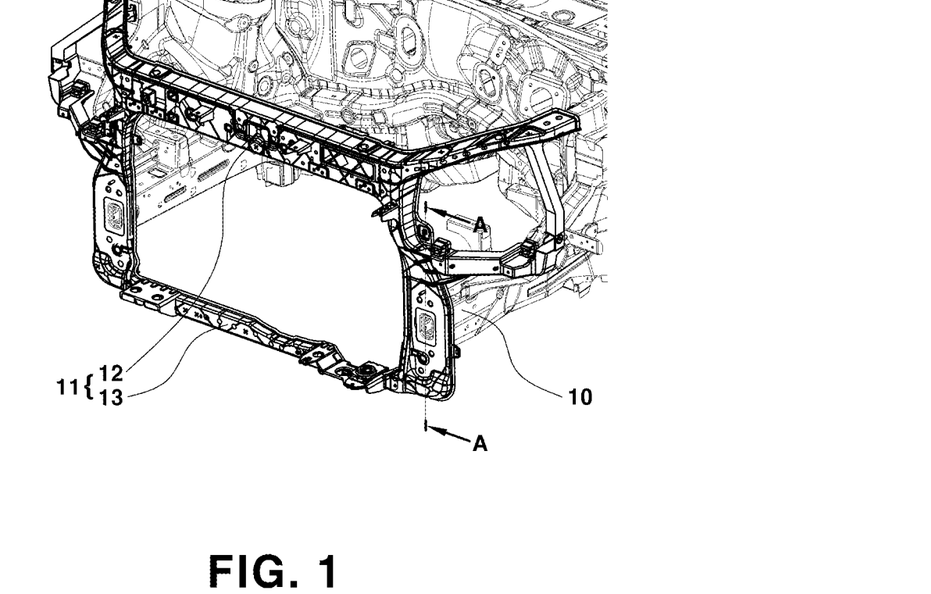
FIG. 1 is a perspective view illustrating a typical connection structure between a front end module and a front side member.
Figure 2:
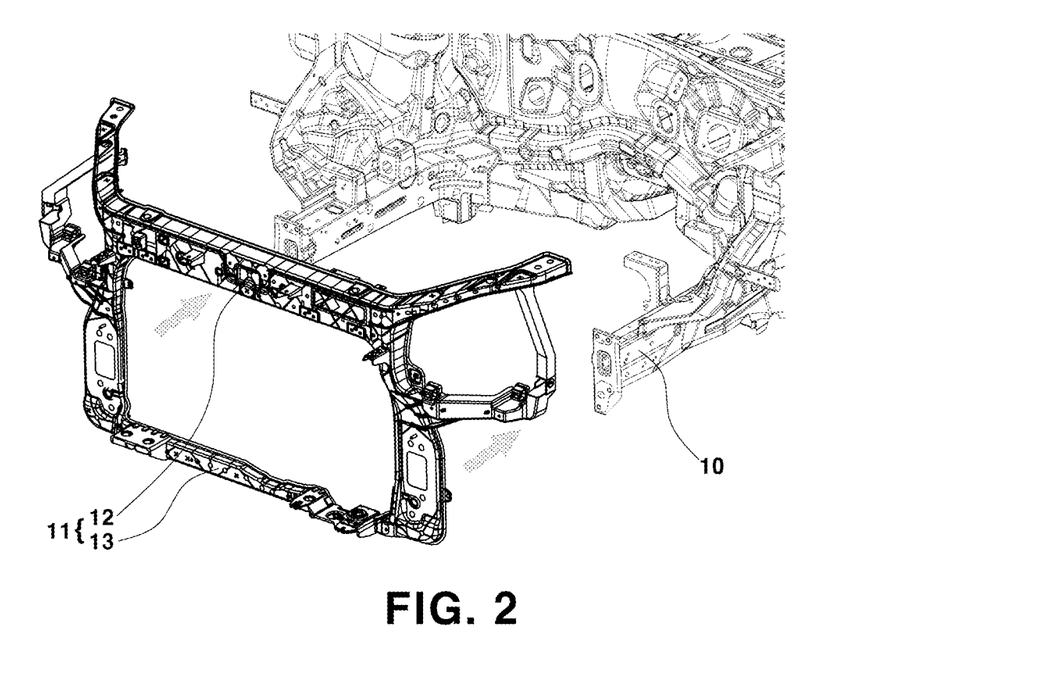
FIG. 2 is an exploded perspective view illustrating a typical connection structure between a front end module and a front side member.

FIGS. 1 and 2 are perspective views illustrating a typical connection structure between a front end module and a front side member.

As shown in FIGS. 1 and 2, a front end module 11 is disposed at the front of a front side member 10. An upper member 12 of the front end module 11 is connected to the rear end portion of the front end 10, and the lower member 13 is connected to the front end portion of the front side member 10. Thus, the front side member 10 and the front end module 11 can be integrally assembled.

Figure 3:
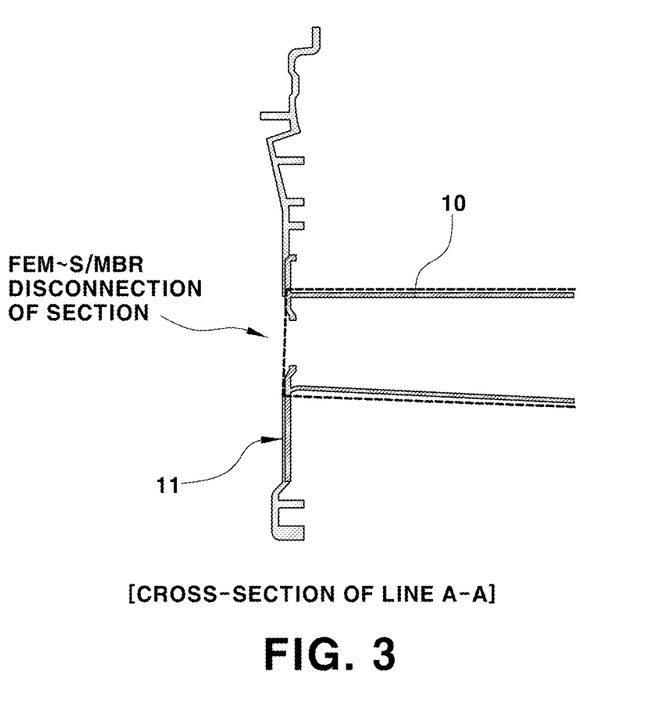
FIG. 3 is a cross-sectional view taken along line A-A of FIG. 1.

However, in the connection structure of the lower member 13 of the front end module 11 and the front side member 10 as shown in FIG. 3, since the front end module 11 is disconnected from the vehicle body in terms of sectional structure of the connection, the stiffness of the lower member 13 may be reduced, and thus, occurrence of booming due to resonance and reduction of vehicle body stiffness may be incurred.

Also, due to the sectional disconnection of the lower member 13 of the front end module 11, the front end module 11 may be severely deformed upon low-speed crash, reducing the low-speed crash performance.

In this regard, Japanese Patent Application Publication Nos. 2011-084196, 10-264855, and 2000-177651, and Japanese Patent No. 4,938,717 disclose various structures in which the stiffness of a front end module is reinforced.

However, since the above-mentioned technologies disclose a structure of a vehicle body in which the stiffness is mainly increased, or a structure integrally formed by welding after a polymerization connection, or a structure connected by welding while requiring a separate connection bracket, there are limitations in terms of the number of components, structure, and assembly workability. Particularly, the stiffness of the connection part between the front end module and the front side member needs to be reinforced.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure provides a front end module of a vehicle, which can improve the booming phenomenon and the low-speed crash performance through a stiffness increase effect of a front end module lower member, by applying a box-type mounting part upon connection between the front end module lower member and a front side member such that the section of the front end module lower member and the section of the front side member are connected to each other.

In one aspect, the present disclosure provides a front end module for a vehicle, including: a first box-type mounting part on a connection portion of a front end module lower member; and a second box-type mounting part on a front end portion of a front side member configured to couple to the first box-type mounting part, wherein the first and second box-type mounting parts are coupled to each other by bolt coupling or welding such that sections thereof are connected to each other upon assembling of the front end module and the front side member.

In an exemplary embodiment, the first box-type mounting part of the front end module lower member may have a female shape, and the second box-type mounting part of the front side member may have a male shape such that the second box-type mounting part of the front side member is inserted into the first box-type mounting part of the front end module lower member.

In another exemplary embodiment, the first box-type mounting part of the front end module lower member and the second box-type mounting part of the front side member may be connected to each other by bolt coupling in a first direction on a contact surface therebetween and bolt coupling in a second direction orthogonal to the first direction on a lower end contact portion therebetween.

Other aspects and exemplary embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Reference numerals set forth in the Drawings include reference to the following elements as further discussed below:

| | |
|---|---|
| 10: front side member | 11: front end module |
| 12: front end module upper member | 13: front end module lower member |
| 14a, 14b: box-type mounting part | 15a, 15b: bolt coupling part |

It should be understood that the accompanying drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of the disclosure are discussed infra.

Hereinafter, exemplary embodiments of the present disclosure will be described in detail with reference to the accompanying drawings.

Figure 4:
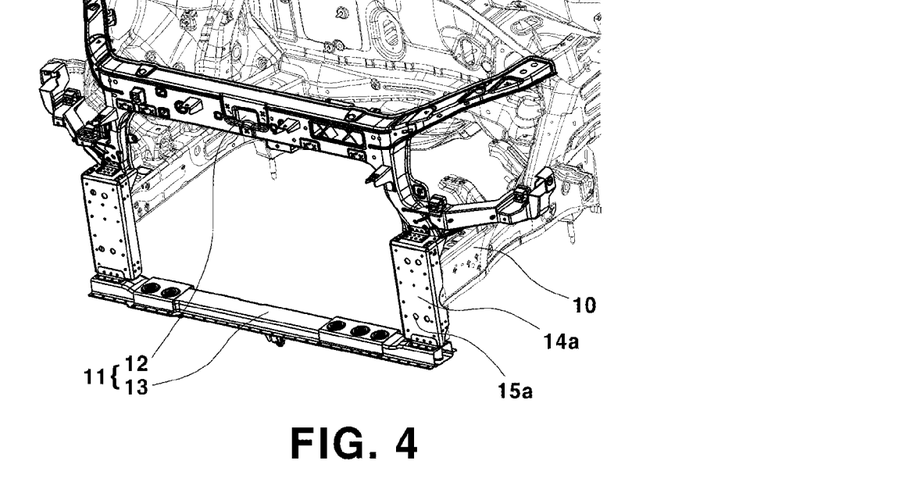
FIG. 4 is an assembled perspective view illustrating a connection structure between a front end module and a front side member according to an embodiment of the present disclosure.
Figure 5:
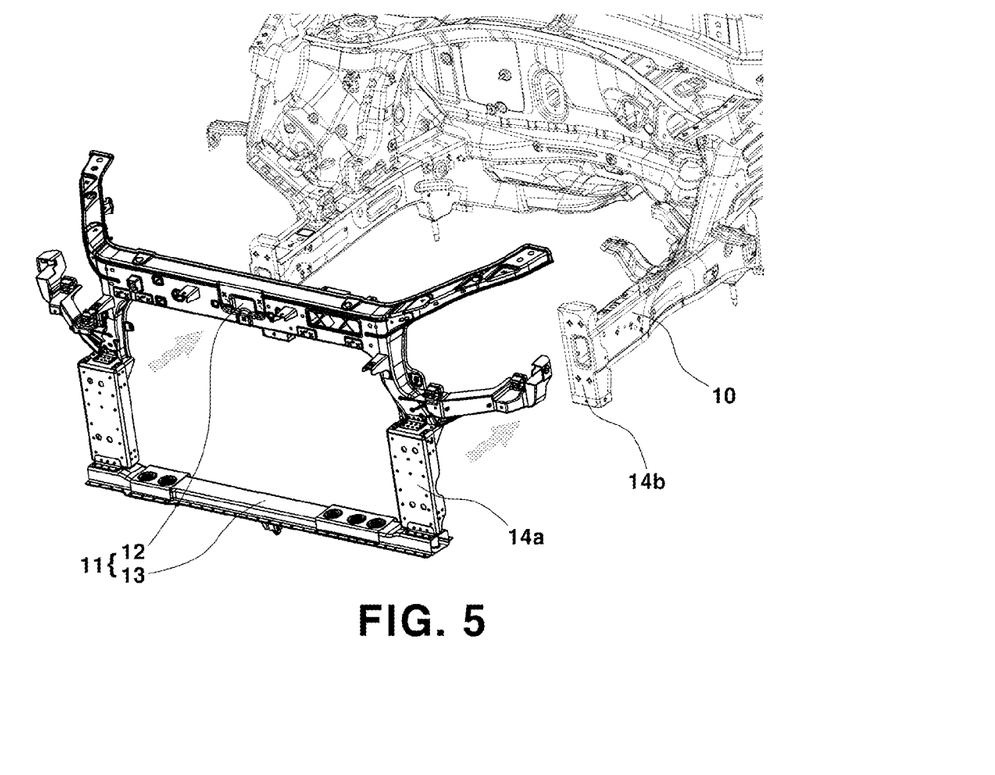
FIG. 5 is an exploded perspective view illustrating a connection structure between a front end module and a front side member according to an embodiment of the present disclosure.

FIGS. 4 and 5 are perspective views illustrating connection structures between a front end module and a front side member according to an embodiment of the present disclosure.

As shown in FIGS. 4 and 5, a front end module lower member 13 and a front side member 10 may be connected to each other via box-type mounting parts 14a and 14b such that the section of the assembly is connected. Accordingly, the stiffness of the front end module lower member 13 and the front end module 11 can increase, and the overall stiffness of the vehicle body can increase.

For this, the connection part of the front end module lower member 13 with the front side member 11, i.e., the box-type mounting part 14a on the right and left end portion of the lower member 13 may be vertically disposed, and the box-type mounting part 14b may also be vertically disposed on both front end portions of the front side member 10 parallel to each other, respectively.

Thus, both box-type mounting parts 14a and 14b may be connected to each other by bolt coupling or welding such that the box-type mounting part 14a of the front end module lower member 13 and the box-type mounting part 14b of the front side member 10 contact each other upon assembling of the front end module 11 and the front side member 10. Thus, the front end module lower member 13 and the front side member 10 may have a structure in which their sections are connected to each other.

As the connection structure is implemented by the box-type mounting parts 14a and 14b, the front end module 11, particularly, the front end module lower member 13 can increase its stiffness, and thus the booming phenomenon and the low-speed crash performance can be improved.

Figure 6A:
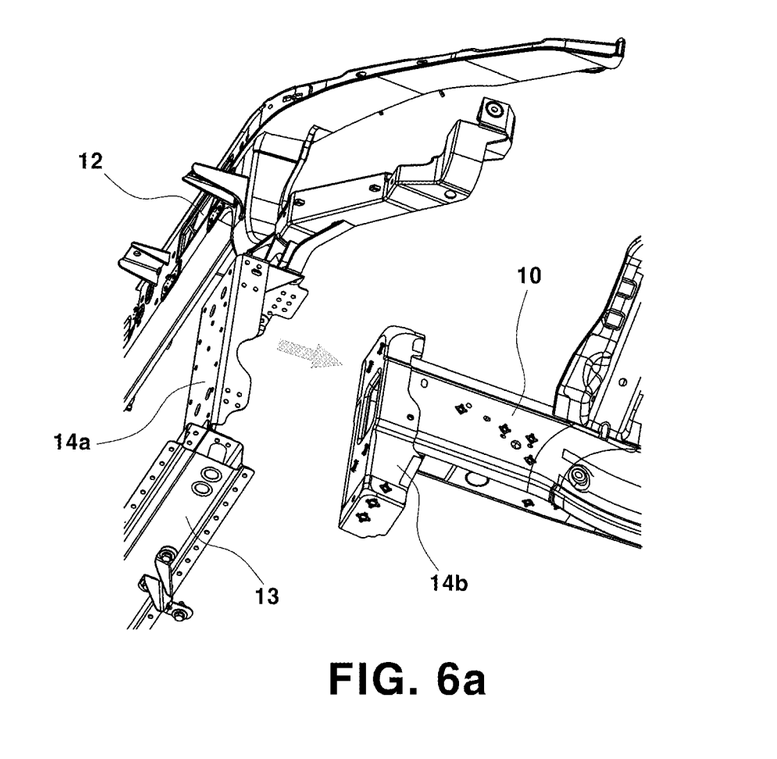
FIGS. 6A and 6B are magnified views illustrating a pre-assembly state of a connection structure between a front end module and a front side member according to an embodiment of the present disclosure.
Figure 6B:
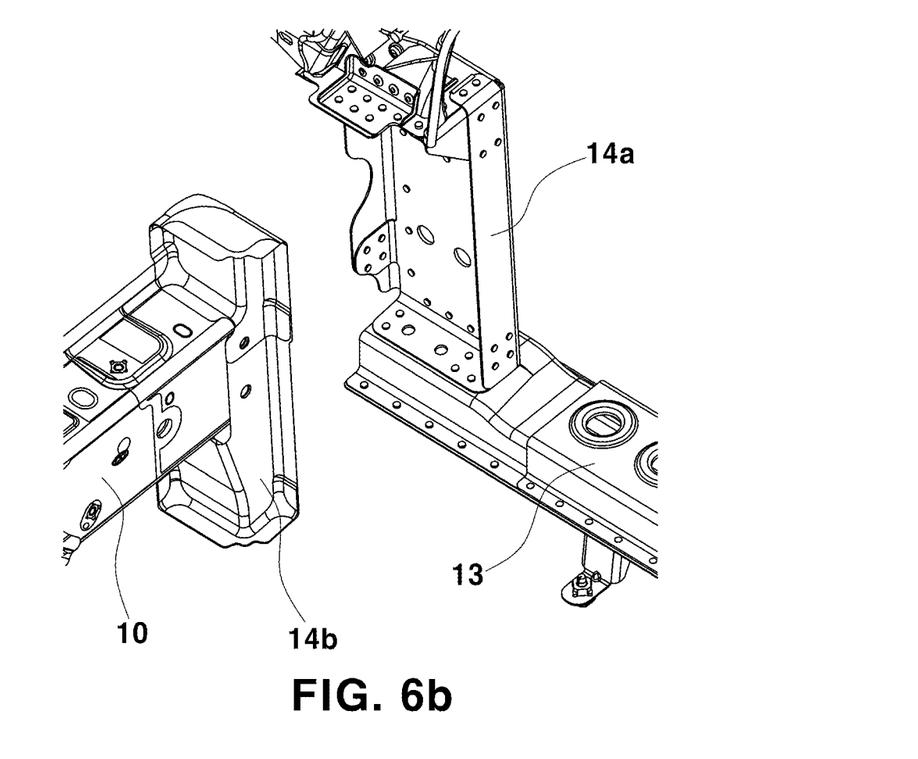
Figure 7A:
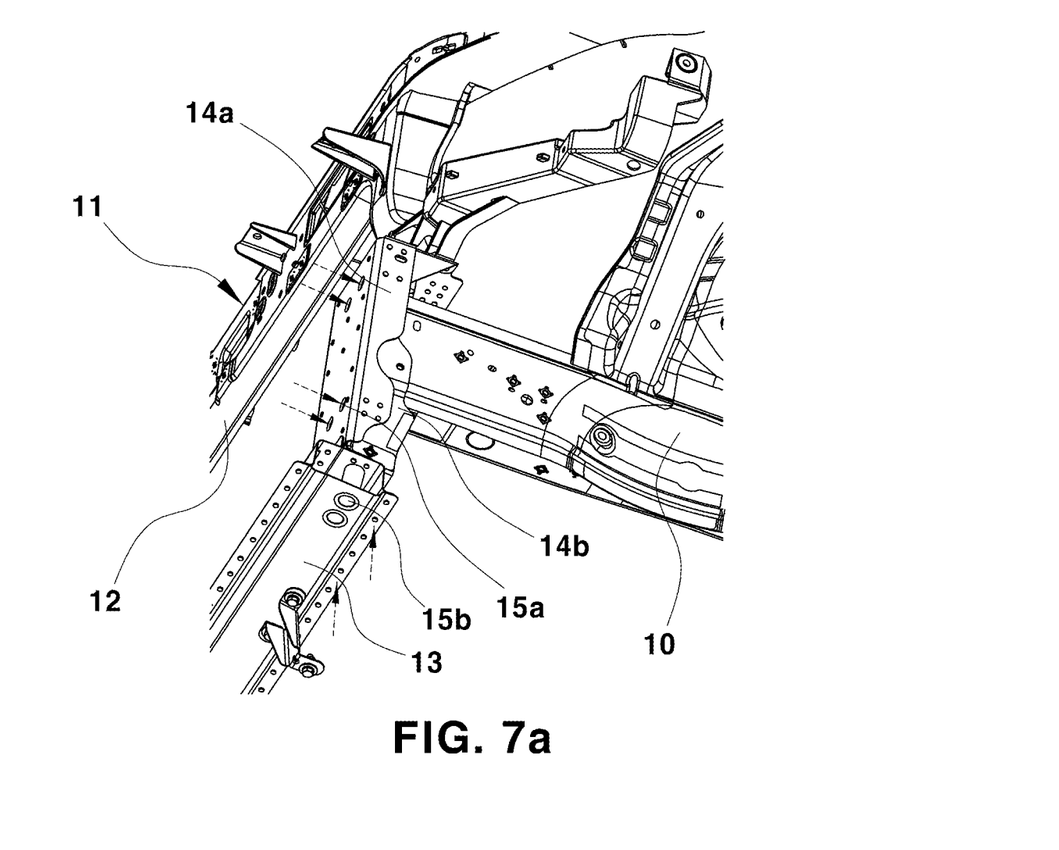
FIGS. 7A and 7B are magnified views illustrating a post-assembly state of a connection structure between a front end module and a front side member according to an embodiment of the present disclosure.
Figure 7B:
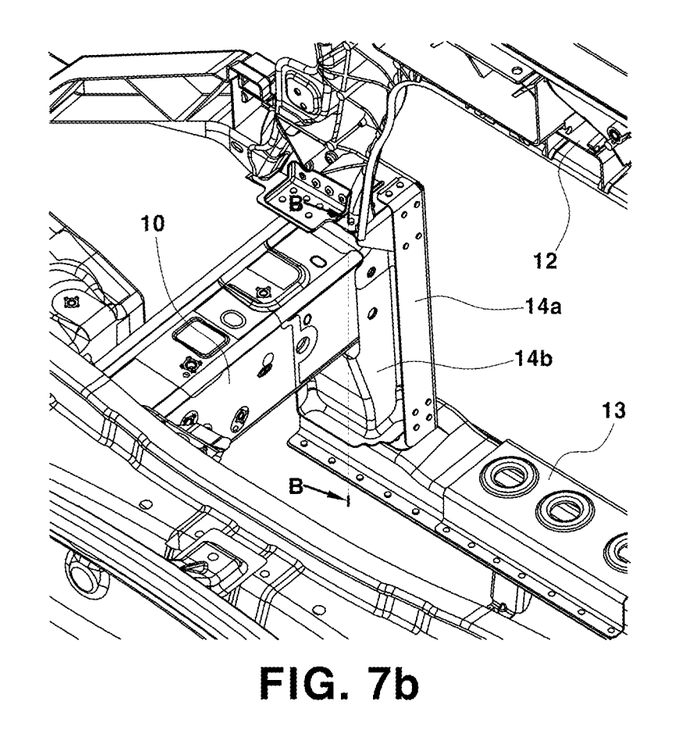

FIGS. 6A and 6B are magnified views illustrating a pre-assembly state of a connection structure between a front end module and a front side member according to an embodiment of the present disclosure. FIGS. 7A and 7B are magnified views illustrating a post-assembly state of a connection structure between a front end module and a front side member according to an embodiment of the present disclosure.

As shown in FIGS. 6A, 6B, 7A and 7B, the box-type mounting part 14a of the front end module lower member 13 and the box-type mounting part 14b of the front side member 10 may have a rectangular box-type structure.

The box-type mounting part 14a of the front end module lower member 13 may have a female shape, in which the front side and all side surfaces are closed and the rear side is opened. The box-type mounting part 14b of the front side member 10 may have a male shape, which can be fitted into the box-type mounting part 14a of the front end module lower member 13.

Accordingly, when the front end module 11 is coupled to the front side member 10, the box-type mounting part 14b of the front side member 10 may be inserted into the box-type mounting part 14a of the front end module lower member 13, and then coupled by bolt coupling.

For example, when the box-type mounting part 14a of the front end module lower member 13 and the box-type mounting part 14b of the front side member 10 are temporarily coupled to each other, the vertical contact surface may be fastened by a bolt coupling part 15a in the horizontal direction, and the low end contact surface may be fastened by a bolt coupling part 15b in the vertical direction. In this embodiment, the horizontal direction may be designated as a first direction, and the vertical direction may be designated a second direction orthogonal to the first direction.

In this case, the bolt coupling part 15a of the horizontal direction may be formed at four locations, two upper locations and two lower locations, and the bolt coupling part 15b of the vertical direction may be formed at two locations.

Thus, since the front end module lower member 13 and the front side member 10 are connected to each other by the box-type mounting parts 14a and 14b having a male-female shape, the coupling can be regulated in all directions, and thus a stronger connection structure can be secured.

Figure 8A:
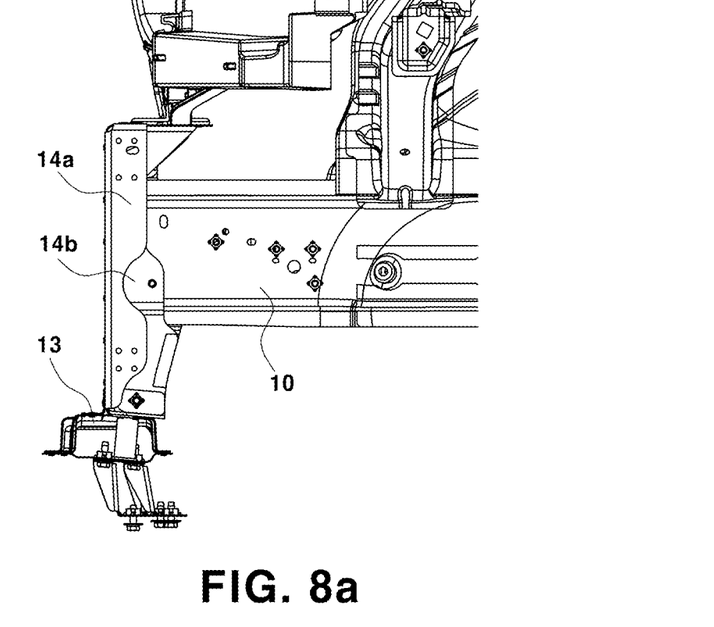
FIGS. 8A and 8B are a cross-sectional view and side view, respectively, illustrating a connection structure between a front end module and a front side member according to an embodiment of the present disclosure.
Figure 8B:
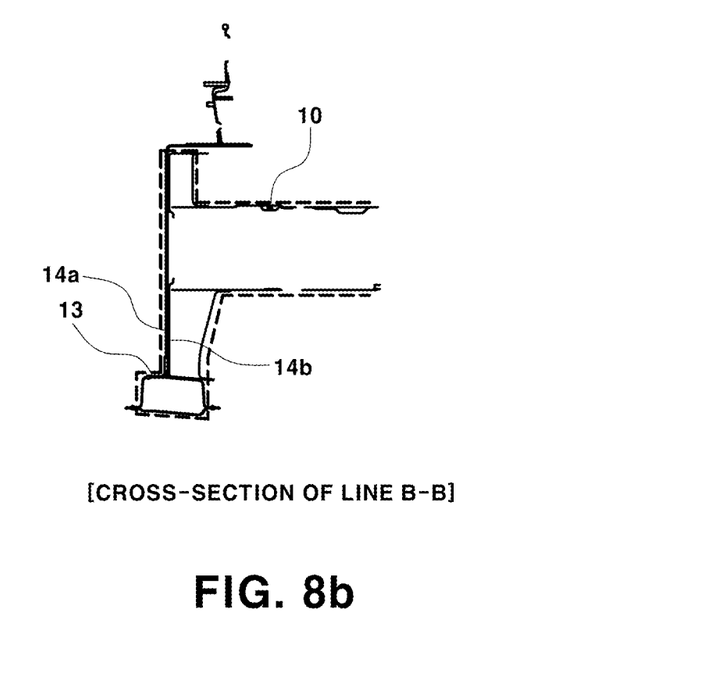

FIGS. 8A and 8B are a cross-sectional view and a side view, respectively, illustrating a connection structure between a front end module and a front side member according to an embodiment of the present disclosure.

As shown in FIGS. 8A and 8B, while the box-type mounting part 14b of the front side member 10 is being held in the box-type mounting part 14a of the front end module lower member 13, the front end module 11 and the front side member 10 may be integrally connected to each other by the bolt coupling part 15a of the horizontal direction and the bolt coupling part 15b of the vertical direction (see, FIG. 7A).

The section of the connection part between the front side member 10 and the front end module lower member 13 may be blocked by a vertical wall overlapped by the two box-type mounting parts 14a and 14b, thereby exerting a higher stiffness than a typical disconnected section.

Thus, since the front end module 11 and the front side member 10 are assembled such that their sections are connected to each other, the booming phenomenon due to the increase of stiffness can be improved, and the deformation of the front end module upon low-speed crash can be minimized, thereby increasing the low-speed performance.

A front end module for a vehicle according to an embodiment of the present disclosure has the following advantages by applying a structure in which the section of a front end module lower member and the section of a front side member are connected to each other.

First, the bending stiffness and torsional stiffness of a vehicle body can be reinforced. For example, torsional stiffness may be improved about 15% or more.

Second, the booming phenomenon can be improved due to the stiffness increase of the front end module lower member.

Third, upon low-speed crash, the deformation of the front end module can be minimized, and thus the low-speed crash performance can be improved by the sectional connection of the front end module lower member.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A front end module for a vehicle, comprising:
a first box-type mounting part coupled to a front end module lower member; and
a second box-type mounting part coupled to a front end of a front side member and fitted into the first box-type mounting part of the front end module lower member to be coupled with the first box-type mounting part,
a first bolt coupling part for fastening a vertical contact surface of the second box-type mounting part to the first box-type mounting part in a first direction; and
a second bolt coupling part for fastening a low end contact surface of the second box-type mounting part to the front end module in a second direction,
wherein the first box-type mounting part of the front end module lower member and the second box-type mounting part of the front side member are bolt-coupled to each other in the first direction on the vertical contact surface therebetween and bolt-coupled to each other in the second direction orthogonal to the first direction on the low end contact surface therebetween.

2. The front end module of claim 1, wherein the first box-type mounting part of the front end module lower member has a female shape, and the second box-type mounting part of the front side member has a male shape such that the second box-type mounting part is disposed inside the first box-type mounting part.

* * * * *